United States Patent [19]
Goerlich

[11] Patent Number: 4,936,093
[45] Date of Patent: Jun. 26, 1990

[54] SOOT-FILTERING UNIT FOR THE EXHAUST GAS SECTION OF A DIESEL INTERNAL COMBUSTION ENGINE

[75] Inventor: Dieter Goerlich, Emmering, Fed. Rep. of Germany

[73] Assignee: Webasto AG Fahrzeugtechnik, Gauting, Fed. Rep. of Germany

[21] Appl. No.: 234,523

[22] Filed: Aug. 22, 1988

[30] Foreign Application Priority Data

Sep. 8, 1987 [DE] Fed. Rep. of Germany ....... 3730035

[51] Int. Cl.$^5$ .............................................. F01N 3/02
[52] U.S. Cl. ......................................... 60/280; 55/312; 55/466; 55/DIG. 30; 60/303
[58] Field of Search .......................... 60/280, 286, 303; 55/312, 313, 314, 466, DIG. 30

[56] References Cited

U.S. PATENT DOCUMENTS

| | | | |
|---|---|---|---|
| 4,281,512 | 8/1981 | Mills | 60/311 |
| 4,345,431 | 8/1982 | Suzuki et al. | |
| 4,373,330 | 2/1983 | Stark | 60/295 |
| 4,574,589 | 3/1986 | Hasegawa | 60/311 |
| 4,693,078 | 9/1987 | Dettling | 60/297 |
| 4,730,455 | 3/1988 | Pischinger | 60/303 |

FOREIGN PATENT DOCUMENTS

| | | | |
|---|---|---|---|
| 2655932 | 6/1978 | Fed. Rep. of Germany | 60/295 |
| 3204176 | 8/1983 | Fed. Rep. of Germany | |
| 184917 | 9/1985 | Japan | 60/295 |

Primary Examiner—Douglas Hart
Attorney, Agent, or Firm—Sixbey, Friedman, Leedom & Ferguson

[57] ABSTRACT

A soot-filtering unit for an exhaust section of a diesel internal combustion engine with a supercharging device. The soot-filtering unit has at least on soot filter in an exhaust line and a regeneration device for the soot filter which includes at least one burner. The configuration of the unit connects an air intake of the burner of the regeneration device to the supercharging device so that the burner is supplied with a portion of the air charge from the supercharging device of the diesel internal combustion engine. In this connection, the configuration can be done in such a way that the burner is supplied exclusively with air from the air charge produced by the supercharging device, or so that the burner is supplied with a mixture of air from the air charge and exhaust gas from the exhaust gas line. The invention enables the burner of the regeneration device to always be reliably ignited, irrespective of engine performance characteristics, without requiring additional devices, and the construction expense for such a soot-filtering unit can be reduced. Multifilter systems, such as double-filter systems, which have either a single burner as a regeneration device or separate burners, are possible in accordance with various embodiments. Furthermore, operation of the burner is possible either exclusively with air charge from the supercharging device or with a mixture of exhaust gas and air charge in the multifilter systems, as well.

17 Claims, 3 Drawing Sheets

SOOT-FILTERING UNIT FOR THE EXHAUST GAS SECTION OF A DIESEL INTERNAL COMBUSTION ENGINE

BACKGROUND OF THE INVENTION

The invention relates to a soot-filtering unit for the exhaust gas section of a diesel internal combustion engine with a supercharging device, i.e., a so-called supercharged diesel internal combustion engine. The soot-filtering unit includes at least one soot filter placed in an exhaust gas pipe and a regeneration device with at least one burner.

In my own older U.S. patent application Ser. No. 196,558, filed on May 20, 1988, a soot filter unit for the exhaust of a diesel internal combustion engine is disclosed. In the unit of this earlier application, the burner of a regeneration device is operated with the exhaust gas from the diesel internal combustion engine as its combustion air supply. However, it now appears that, under certain operating conditions, the engine performance characteristics of the diesel internal combustion engine may result in the oxygen content of the exhaust gas becoming insufficient for reliable functioning of the burner. Further, there also is the potential problem that the gas generated by the burner and used for regeneration of the soot filter will not contain enough oxygen for the combustion of the soot necessary to produce regeneration of the soot filter. These comments also apply to the exhaust gas unit of my U.S. patent application Ser. No. 196,557, that was also filed on May 20, 1988.

On the other hand, it has already been suggested, for example, from U.S. Pat. No. 4,345,431 and German Offenlegungsschrift No. 32 04 176, that a burner of a regeneration device be operated with combustion air that is supplied from an external source. However, such devices require relatively high combustion air supply pressures which necessitate the provision of additional compressors or blowers to supply the combustion air. The need for such a blower or compressor increases the cost for such a soot-filtering device and such a blower or compressor also increases operating expenses due to the relatively high power it consumes to function.

In recent years, in the field of diesel internal combustion engines, supercharging has been used to an increasing extent, and by which air that is under a boost pressure is fed to the cylinders of the internal combustion engine. A common form of supercharging device comprises a turbine in the exhaust gas section of the diesel internal combustion engine which is coupled to a compressor whose outlet is connected to the air intake pipe or pipes of the diesel engine. This form of supercharging is also commonly known as turbocharging and it enables higher performance and an improved combustion efficiency to be obtained.

SUMMARY OF THE INVENTION

In view of the foregoing, a primary object of the invention is to provide a soot-filtering unit for the exhaust gas section of a diesel internal combustion engine that is intended for so-called supercharged diesel internal combustion engines.

According to preferred embodiments of the invention, a soot-filtering unit for a diesel internal combustion engine with a supercharging device, utilizes at least one soot filter placed in an exhaust gas pipe and a regeneration device with at least one burner, wherein the burner is connected to the supercharging device to receive combustion air therefrom.

In a soot-filtering unit according to the invention, the air that is generated by the supercharging device is under a predetermined boost pressure and a portion thereof is fed to the burner so that the air can be used as combustion air for the burner, either alone or mixed with exhaust gas. With such a supercharged diesel engine, air that is under the desired pressure, the so-called air charge, is available which, according to the invention, is additionally used for operating the burner of the regeneration device of the soot-filtering unit. Thus, with a soot-filtering unit according to the invention, additional compressors are no longer needed to supply combustion air under pressure to the burner, so that the whole soot-filtering unit is considerably simplified. On the other hand, the burner can be operated reliably under all operating conditions of the diesel engine, since it is not exclusively dependent on the oxygen content of the exhaust gas. In this way, controlling of such a burner for soot filter regeneration is, also, simplified and improved operating reliability is achieved, without having to accept a relatively high and costly additional construction expense.

According to a preferred embodiment according to the invention, the burner can also be supplied with exhaust gas from the exhaust gas line of the diesel internal combustion engine. In this way, possible difficulties can be avoided whose cause lies in the fact that, for example, when the diesel engine is idling, the pressure of the air charge delivered by the supercharging device is insufficient to guarantee reliable functioning of the burner in this idling operating range. That is, for all engine performance characteristics, operating conditions for the burner are achieved which make the burner always capable of reliable combustion because with low engine load, when the boost pressure of the air charge generated by the supercharging device is also low, little air charge is fed to the burner, but the exhaust gas from the exhaust gas section, that is simultaneously mixed in, has a relatively high oxygen content, so that no difficulties result during operation of the burner in this load condition. On the other hand, when engine load is high, the air charge delivered by the turbocharging device is under high boost pressure, so that a great deal of air charge can be fed to the burner, and reliable burner operation is still achieved even though the exhaust gas in the exhaust gas section has a relatively low oxygen content, since the low oxygen content of the exhaust gas is offset by the increased air supply from the supercharging device. This measure of feeding the burner of the regeneration device with exhaust gas as well as with air charge from the turbocharging device, thus, achieves an automatic supplementation of the combustion air supply received by the burner throughout the working range. Depending on the configuration of the soot-filtering unit which, in advantageous other embodiments according to the invention, can comprise two or more soot filters connected in parallel, according to the invention, a configuration can suitably be found in which a common burner is provided for regeneration. Thus, because only a single burner is needed, even when the unit has several soot filters, construction expenses may be kept as low as possible. Alternatively, and especially when using so-called multifilter systems, it is also possible to allocate a burner to each soot filter so that the number of burners corresponds to the number of soot filters.

If the burner of the regeneration device is to be supplied with exhaust gas as well as with air charge from the supercharging device, it has proven suitable to place the burner or burners directly in the exhaust gas pipe or exhaust gas pipes so that the burner always has exhaust gas flowing through it. But, alternatively, the burner or burners can also be placed parallel to the exhaust gas pipe(s) to avoid a constant flow of exhaust gas through the burner or burners. Further, such a configuration also makes it possible that, optionally, the burner or burners can be supplied with combustion air exclusively from the air charge from the supercharging device. In this case, it is desirable to control the burner or burners in such a way that the burner cannot be operated during idling of the diesel engine since, in this case, the oxygen available for combustion in the burner, in fact, does not suffice for reliable operation of the burner.

To be able to vary the air charge feed to the burner or burners, it is advantageous if a regulation device is present in the connecting pipe between the burner or burners and the supercharging device. This regulation device can suitably be a valve and, preferably, is a solenoid valve.

To prevent exhaust gas from escaping through a connecting pipe from the supercharger, when a combined feed of exhaust gas and air charge from the supercharging device is utilized, advantageously, a nonreturn valve is placed in the connecting pipe or pipes between the supercharging device and the burner that prevents a passing of exhaust gas into the connecting pipe or pipes.

According to a suitable embodiment according to the invention, the burner or burners can be supplied with combustion air only from the supercharging device. In particular with multifilter systems of such a soot-filtering unit, it is advantageous that relatively little air is taken from the supercharging device for operation of the burner of the regeneration device, so that, in doing so, the supercharging of the internal combustion engine is negatively influenced only imperceptibly.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figures 1, 2:
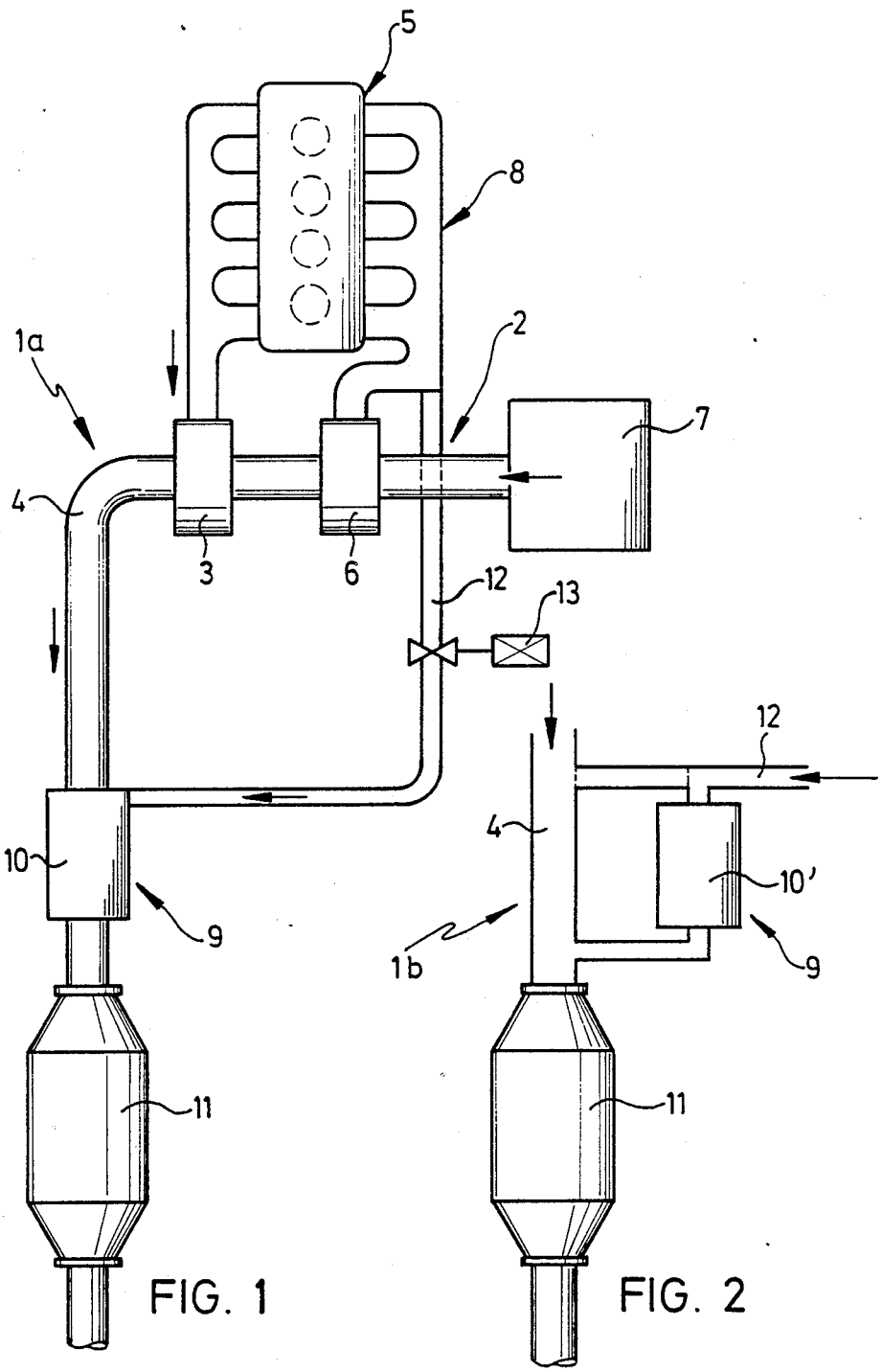
FIG. 1 is a diagrammatic view of a soot-filtering unit with a single soot filter, in which the burner of the regeneration device is supplied with exhaust gas from the exhaust gas line of a diesel internal combustion engine as well as from an air charge from a turbocharging device.
FIG. 2 shows a variation of the embodiment according to FIG. 1 in which, however, the burner of the regeneration device is not in the exhaust gas section of the diesel internal combustion engine, but rather is placed parallel to it.

In the figures of the drawing the same or similar parts are provided with the same reference symbols. However, for differentiation, the various embodiments of the soot-filtering unit represented in the figures are distinguished alphabetically, i.e., 1a, 1b, 1c, and 1d, while prime (') designations are utilized to indicate variations pertaining to the soot filter(s) and the regeneration burner(s) therefor. Also, even though soot-filtering units 1a to 1d are described relative to a turbocharged diesel internal combustion engine, it will be appreciated that, in an analogous manner, these embodiments may be utilized with supercharged diesel engines wherein the compressor or blower supplying the air charge to the air intake of the engine is not exhaust turbine driven.

Soot-filtering unit 1a, shown in FIG. 1, is intended as an example of a four-cylinder diesel internal combustion engine that has a supercharging device 2. Supercharging device 2 is of the turbocharger type and comprises a turbine 3 that is placed in an exhaust gas line 4 of diesel internal combustion engine 5. A compressor 6 is coupled to turbine 3 so as to be driven thereby and it compresses air which is taken in through a suction air filter 7. The air compressed by compressor 6 is introduced from its outlet into an air intake system 8 of diesel engine 5.

The regeneration device of soot-filtering unit 1a is designated 9, as a whole. Regeneration device 9 has a burner 10 which is located in the exhaust gas line 4 of diesel engine 5. A soot filter 11 is placed in exhaust gas line 4 downstream from burner 10, in the example represented.

As also illustrated in FIG. 1, a connecting pipe 12 runs from the air intake system 8 of diesel engine 5 to the outlet of compressor 6 of supercharging device 2 for connecting air intake system 8 with the combustion air intake of burner 10. As shown, for example, a solenoid valve 13 can be placed in connecting pipe 12 as a regulating device for controlling the quantity of air which may be received by burner 10 from air intake system 8.

With soot-filtering unit 1a, when soot filter 11 is to be regenerated, i.e., when soot particles collected therein are to be burned off, burner 10 of regeneration device 9 is supplied with exhaust gas from exhaust gas line 4 and with a portion of the air charge from supercharging device 2 through connecting pipe 12. With the aid of solenoid valve 13 in connecting pipe 12, the air charge amount fed to burner 10 can be regulated.

When diesel engine 5 is idling and burner 10 of regeneration device 9 is to begin operation, the exhaust gas in exhaust gas line 4 acts essentially as a combustion air supply medium for burner 10, since supercharging device 2 cannot generate an air charge of sufficient pressure during idling. This is possible since the exhaust gas, during idling of diesel engine 5, has a high enough oxygen content to enable burner 10 to be ignited and operated. As soon as the engine load increases, but for example is still in a lower load range, supercharging device 2 delivers air charge with a low boost pressure, which is then additionally fed to burner 10. In this working range of diesel engine 5, the oxygen content in the exhaust gas decreases, so that, due to the additional feed of air charge, a reliable ignition and operation of burner 10 is still guaranteed. With high engine loads, the boost pressure of the air charge from supercharging device 2 is, likewise, correspondingly high so that, even though the oxygen content in the exhaust gas becomes small, enough air charge is diverted from supercharging device 2 to the burner 10 to be able to still operate reliably in this operating condition of the diesel engine 5. The configuration of soot-filtering unit 1a according to the invention, thus, makes it possible that, depending on the operating condition of diesel engine 5, by the additional feed of the air charge from supercharging device 2 through connecting pipe 12, operating conditions are always automatically present in burner 10 which enable it to be reliably ignited and operated.

The embodiment of a soot-filtering unit 1b represented in FIG. 2 is also a so-called single-filter system, and the representation of the diesel internal combustion engine 5 and the more detailed particulars of supercharging device 2 are omitted since they will be the same as for the embodiment of FIG. 1. As an essential difference, in comparison with soot-filtering unit 1a, in soot-filtering unit 1b, burner 10' is not placed in exhaust gas 4, but is placed parallel to it, i.e., the burner is in a so-called bypass branch. In the example represented in solid lines in FIG. 2, burner 10' is fed with exhaust gas from exhaust gas line 4 and also with air charge from the supercharging device via connecting pipe 12. On the other hand, as is indicated with dashed lines in FIG. 2, the configuration can also be varied so that the connecting pipe 12 from the supercharging device does not connect with exhaust gas line 4. In such a case, combustion air supply for burner 10' is provided exclusively by the air charge from the supercharging device. In all other respects the details shown in FIG. 1 apply to the FIG. 2 embodiment of soot-filtering unit 1b. Although it is not represented in more detail, it may be advantageous to place a nonreturn valve in connecting pipe 12 to prevent exhaust gas from passing from exhaust gas line 4, through line 12 in the direction of supercharging device 2 or intake system 8 of the diesel engine.

Figure 3:
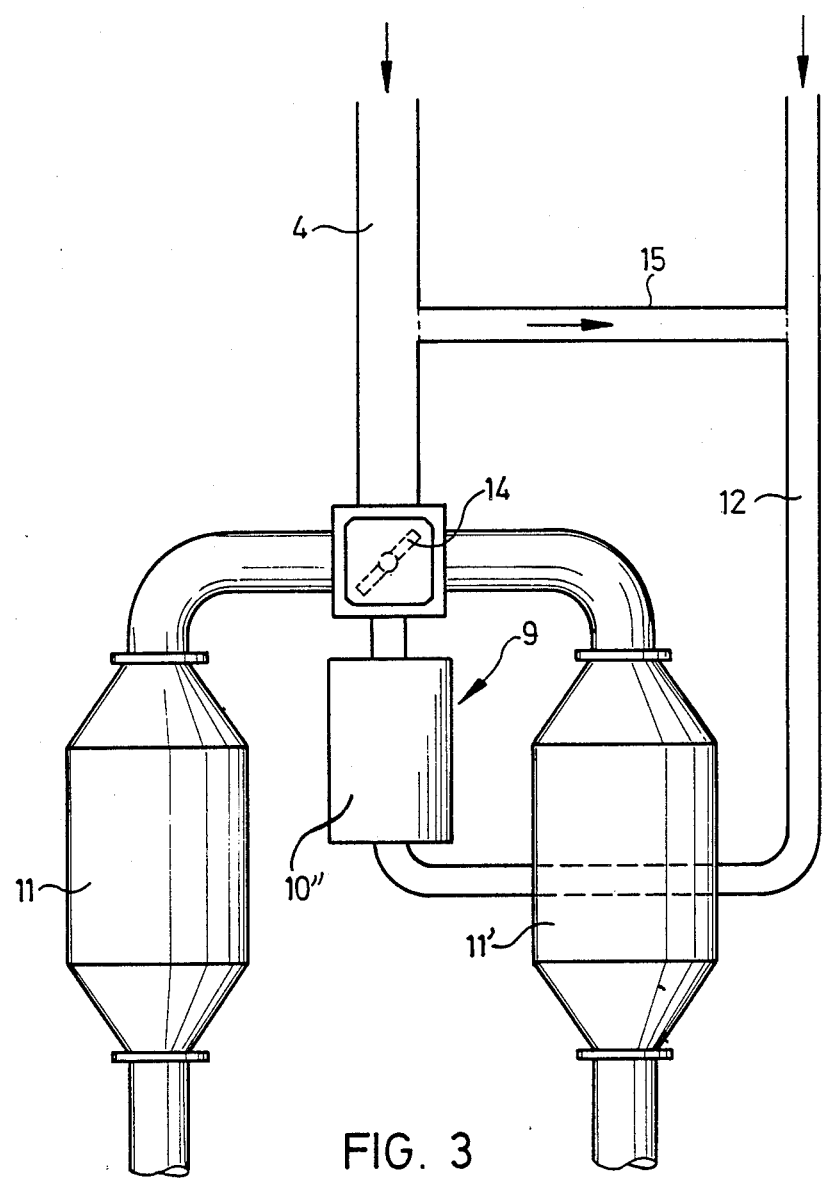
FIG. 3 is a diagrammatic view of a soot-filtering unit with a single burner for regeneration of two parallel soot filters, as an example of a multifilter system.

In FIG. 3, a soot-filtering unit, designated overall by 1c, is shown as an example of the application of the invention to a multifilter system. For illustration purposes, a configuration with two parallel soot filters 11, 11' has been chosen, but it should be apparent that it is also applicable to a multifilter arrangement having two pairs of soot filters as shown in the second of my above-mentioned earlier applications. Here, exhaust gas line 4 is branched and a soot filter, 11 or 11', is placed in each branch. At the branching point of exhaust gas line 4, a flap valve 14 is placed which acts as a flow control device and which, according to its position, diverts the exhaust gas stream through one soot filter (11, as shown in the example represented) or the other. When soot filter 11 has to be regenerated, the flap is turned about 90° from the position shown in FIG. 3 and the exhaust gas in exhaust gas line 4 is then fed to soot filter 11'.

The regeneration device 9 includes, in this embodiment, a single burner 10", which is intended to serve for the regeneration of both soot filters 11, 11'. The outlet of burner 10" opens into the branching area of exhaust gas line 4, and the hot exhaust gas stream generated by burner 10" is then diverted by flap 14 to the respective one of soot filters 11, 11' to be regenerated. Air charge from the supercharging device (not represented in FIG. 3) is fed to burner 10" through connecting pipe 12. Further, solid lines represent a connecting pipe 15, by which a connection is produced between exhaust gas line 4 and connecting pipe 12. Through this connecting pipe 15, exhaust gas is mixed with the air charge stream in connecting pipe 12, so that burner 10" is supplied with a mixture of air charge and exhaust gas from exhaust gas section 4.

As indicated by dashed lines in FIG. 3, the configuration can also be varied in such a way that connecting pipe 15 is omitted. In such a case, burner 10" is supplied solely with air charge from the supercharging device.

Figure 4:
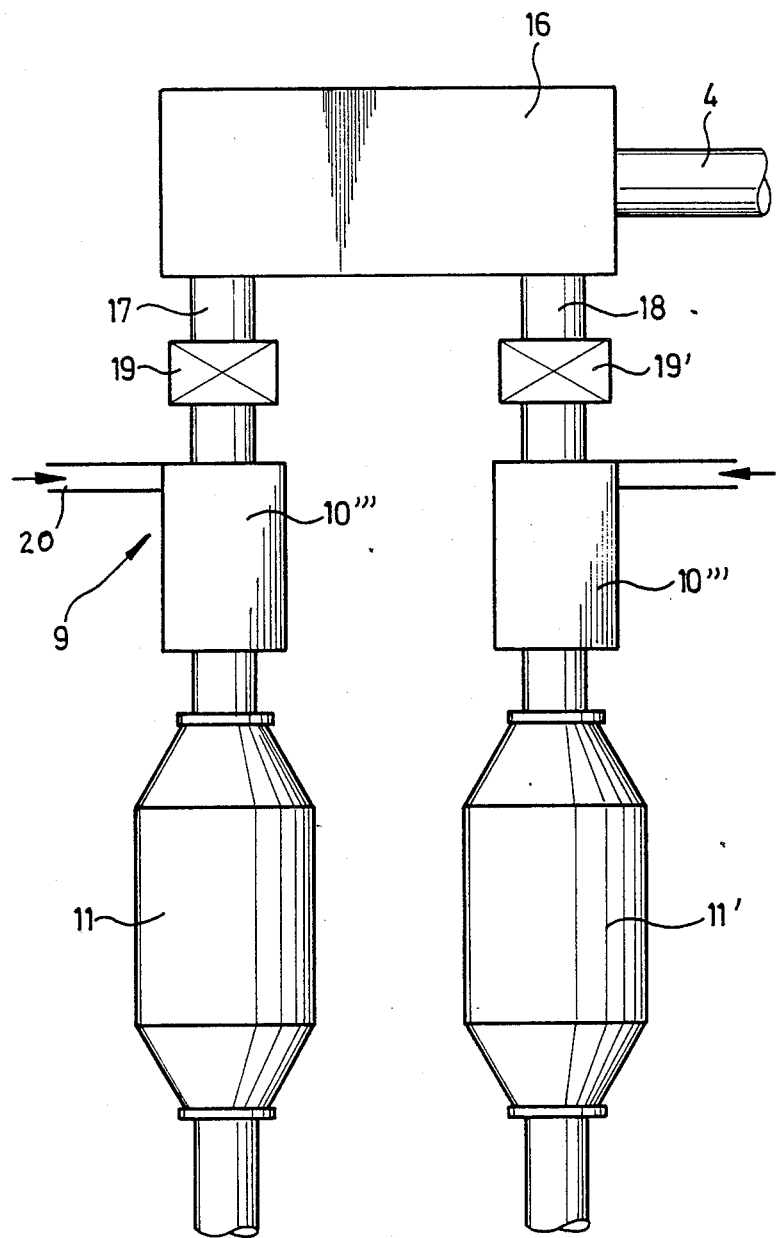
FIG. 4 is a diagrammatic view of a variation of the multifilter system embodiment of FIG. 3 in which the two parallel soot filters are each provided with a burner.

Another embodiment of a multifilter soot-filtering unit is designated 1d, overall, in FIG. 4. Differing from FIG. 3, in the embodiment according to FIG. 4, two parallel exhaust gas pipes 17, 18, in each of which a burner 10''' is placed, branch off from a front muffler 16 in exhaust gas line 4. In each case, flaps 19, 19' are placed upstream from burners 10''', and a soot filter 11, 11' is placed downstream from each burners 10'''. Flaps 19, 19' act to uncouple, in the closed position, the respective filter 11, 11' from muffler 16 to terminate the exhaust gas flow through it to regenerate this filter, while then the exhaust gas is purified by the second parallel soot filter. For example, in the case where flap 19 is closed to permit regeneration of filter 11, flap 19' in exhaust gas pipe 18 is then opened. Burner 10''', which is placed in exhaust gas pipe 17 and which is supplied with air charge from the supercharging device (not represented in FIG. 4) via a branch connecting pipe 20, is then ignited and put in operation, so that it delivers hot combustion gases for regeneration of soot filter 11. If now, in this example, flap 19 or 19' is leaky in the closed position, there occurs a further mixing in of exhaust gas from exhaust gas line 4 through the flap gap formed in this way. If flaps 19, 19' are constructed so that in their closed position there is always a certain leakage path, then burners 10''' in FIG. 4 can also be operated with a combustion air supply derived from a combination of air charge from the supercharger and exhaust gas in exhaust gas line 4.

In combined air supply operation of the burners represented in the drawings, i.e., when the burners are supplied with exhaust gas and air charge, the method of functioning explained above in connection with FIG. 1 is achieved. With all embodiments described above, in which burner 10, 10', 10", 10''' is supplied exclusively with air charge, it must be taken into consideration with regard to burner control that during idling of diesel internal combustion engine 5, the boost pressure of the air charge is not sufficient to operate the respective burner. For this reason the burner control must be designed so that burner 10, 10', 10", 10''' remains shut off during idling of diesel internal combustion engine 5.

Of course, in the embodiments according to FIGS. 2 to 4, regulating valves and the like can also be provided in connecting pipe 12 and/or in connecting pipe 15 in FIG. 3, to control the air feed to burner 10, 10', 10", 10''' in a suitable way.

As already noted, the invention is not limited to the double- or single-filter systems of soot-filtering units 1a to 1d, and more than two soot filters can be provided, and the configuration may be done in a way analogous to that in either of FIGS. 3 and 4. The number of soot filters 11 to 11' provided in soot-filtering unit 1a to 1d depends essentially on the size of the diesel internal combustion engine and/or optionally on the available space. With double- and other multifilter systems, the advantage results that relatively little charge air is taken from the supercharging device for operation of burner 10, 10', 10", 10''', to prevent negative influences on the supercharging operation of the diesel engine 5. This advantage is all the more important when a mixing in of exhaust gas from the exhaust gas line 4 occurs.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

What is claimed is:

1. Soot-filtering unit for an exhaust section of a diesel internal combustion engine with a supercharging device, comprising at least one soot filter placed in an exhaust gas line and a regeneration device with at least one combustion burner having an oxygen inlet and a fuel inlet, wherein said oxygen inlet of the burner is connected to the supercharging device for receiving a portion of an air charge produced by the supercharging device and is also connected to said exhaust pipe for receiving a supply of oxygen from said exhaust gas as a means for assuring that sufficient oxygen for combusting fuel from said fuel inlet in said burner is present in the burner under all operating conditions of the engine.

2. Soot-filtering unit according to claim 1, wherein said burner is placed in an exhaust gas pipe section containing said soot filter.

3. Soot-filtering unit according to claim 1, wherein said burner is placed in a parallel flow relationship relative to a section of an exhaust gas pipe containing said soot filter.

4. Soot-filtering unit according to claim 1, wherein at least two soot filters are arranged in said exhaust line in a parallel flow relationship with respect to each other and a single burner is provided for the regeneration thereof.

5. Soot-filtering unit according to claim 4, wherein a regulating device is provided in a connecting pipe that connects the burner with the supercharging device.

6. Soot-filtering unit according to claim 5, wherein the regulating device is a solenoid valve.

7. Soot-filtering unit according to claim 6, wherein a nonreturn valve is provided in the connecting pipe that connects the burner to the supercharging device as a means for preventing exhaust gas from passing through the connecting pipe to said supercharging device.

8. Soot-filtering unit according to claim 1, wherein at least two soot filters are arranged in said exhaust line in a parallel flow relationship with respect to each other and a single burner is provided for the regeneration thereof.

9. Soot-filtering unit according to claim 1, wherein at least two soot filters are arranged in said exhaust line in a parallel flow relationship with respect to each other and wherein a separate burner is provided for the regeneration of each of said filters.

10. Soot-filtering unit according to claim 9, wherein each of said burners is placed in an exhaust gas pipe section containing a respective one of the soot filters.

11. Soot-filtering unit according to claim 1, wherein at least two soot filters are arranged in said exhaust line in a parallel flow relationship with respect to each other and wherein a separate burner is provided for the regeneration of each of said filters.

12. Soot-filtering unit according to claim 11, wherein each of said burners is placed in an exhaust gas pipe section containing a respective one of the soot filters.

13. Soot-filtering unit according to claim 11, wherein a regulating device is provided in a connecting pipe that connects the burners with the supercharging device.

14. Soot-filtering unit according to claim 13, wherein the regulating device is a solenoid valve.

15. Soot-filtering unit according to claim 14, wherein a nonreturn valve is provided in the connecting pipe that connects the burner to the supercharging device as a means for preventing exhaust gas from passing through the connecting pipe to said supercharging device.

16. Soot-filtering unit according to claim 1, wherein a regulating device is provided in a connecting pipe that connects the burner with the supercharging device.

17. Soot-filtering unit according to claim 1, wherein a nonreturn valve is provided in a connecting pipe that connects the burner to the supercharging device as a means for preventing exhaust gas from passing through the connecting pipe to said supercharging device.

* * * * *